W. G. VANCE.
AUTOMOBILE LOCKING APPARATUS.
APPLICATION FILED SEPT. 6, 1916.

1,218,495.

Patented Mar. 6, 1917.
3 SHEETS—SHEET 2.

Witness
A. V. Doyle.

Inventor,
William G. Vance,
By Victor J. Evans,
Attorney.

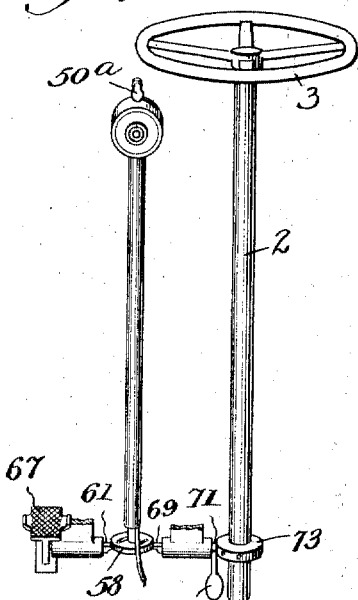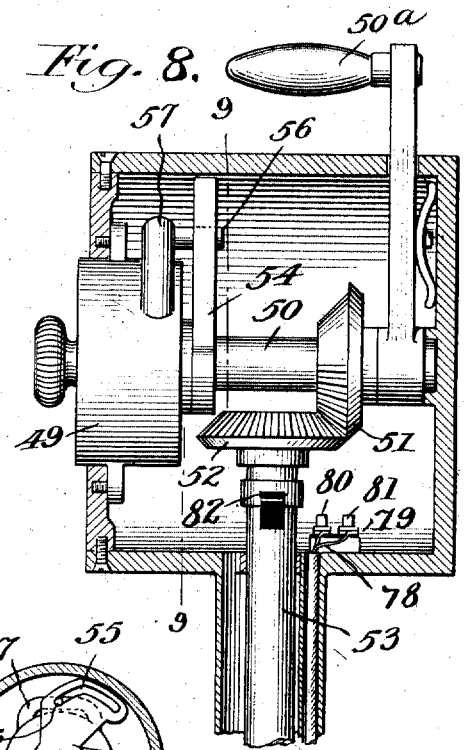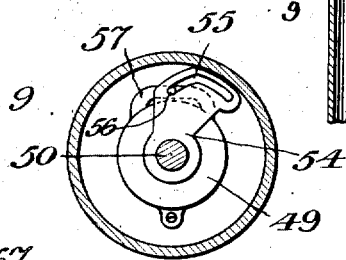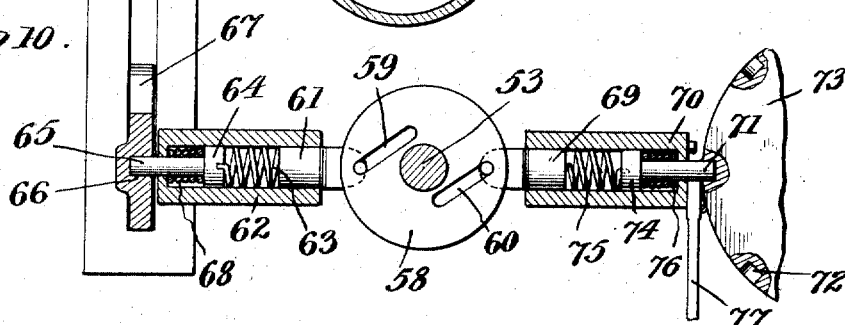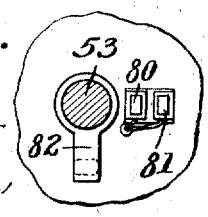

UNITED STATES PATENT OFFICE.

WILLIAM G. VANCE, OF BROOKLYN, NEW YORK, ASSIGNOR OF ONE-HALF TO ROBERT L. YOUNG, OF NEW YORK, N. Y.

AUTOMOBILE-LOCKING APPARATUS.

1,218,495.  Specification of Letters Patent.  Patented Mar. 6, 1917.

Application filed September 6, 1916. Serial No. 118,698.

*To all whom it may concern:*

Be it known that I, WILLIAM G. VANCE, a citizen of the United States, residing at Brooklyn, in the county of Kings and State of New York, have invented new and useful Improvements in Automobile-Locking Apparatus, of which the following is a specification.

This invention relates to automobile attachments and particularly to mechanism which is designed as a safeguard against theft of the car or running of same by unauthorized persons and it has for its principal object, the provision of means for simultaneously effecting a locked condition of the steering mechanism, the clutch mechanism and the ignition system after the car is placed at rest by its owner or operator.

A still further object of the invention resides in the provision of mechanism which may be controlled in order that the front wheels of the car may be turned at an angle toward the curb when standing on the highway whereby to render it extremely difficult to tow the car should such be the aim of a trespasser, and I have therefore employed means for positively locking the wheels in this position by affecting the normal condition of the steering gear at the time of locking the car.

A still further object of the invention is to provide a selective controlling device for rendering the locking mechanism of the steering means inoperative. This arrangement is desired in order that the owner of the car can fully comply with police and fire regulations prohibiting the turning of the steering wheels toward the curb and locking the same.

With the above and other objects in view which will appear as the nature of the invention is better understood, the same consists in the improved construction and novel arrangements of parts which will herein-after be fully described and particularly pointed out in the claims.

In the accompanying drawings, has been illustrated, several preferred forms of the invention, it being, however, understood that no limitations are necessarily made to the precise structural details therein exhibited, but that changes, alterations and modifications within the scope of the claims may be resorted to when desired.

In the drawings:—

Fig. 7 is a view similar to Fig. 1, showing a slightly modified form of the invention.

Fig. 8 is a vertical section through a portion thereof.

Fig. 9 is a section on the line 9—9 of Fig. 8.

Fig. 10 is a horizontal section through the device.

Fig. 11, is a conventional illustration of the circuit closer.

Figure 1:
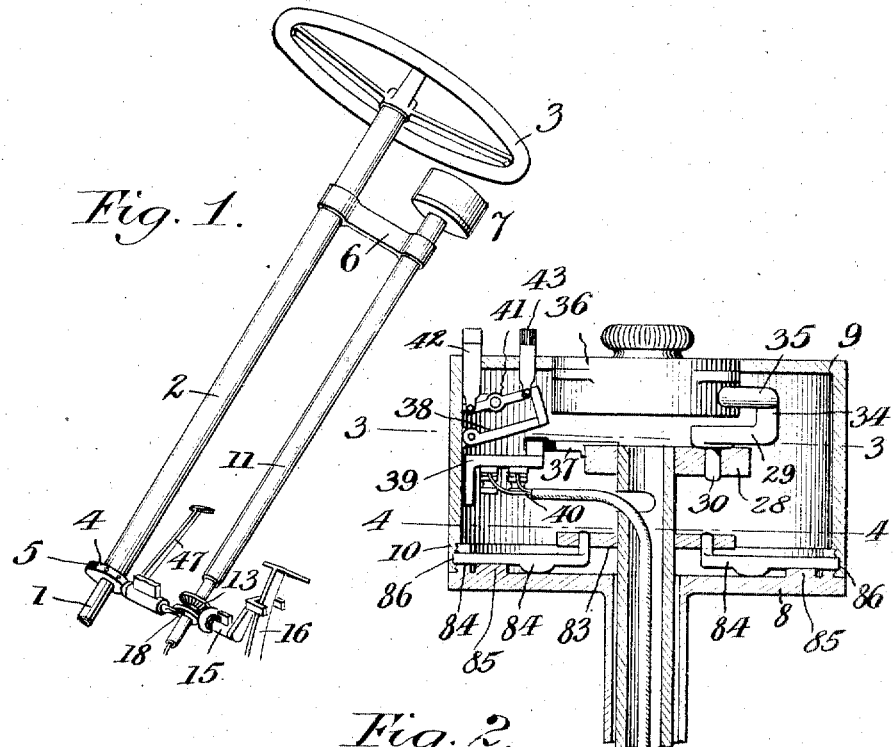
Figure 1 is a perspective view of the steering column of a vehicle showing the application of the invention thereto.

With reference to the form of the invention shown in Figs. 1 to 6 inclusive, use is made of a steering post 1, incased in the usual tubing 2, and provided above the tubing with a steering wheel 3. The mentioned post has a fixed keeper 4, secured thereto at a point below the column 2, and as shown, said keeper is in the form of a disk having a series of spaced recesses 5, formed in its peripheral surface.

Fixedly supported at 6, from the tubing 2, is a casing 7, consisting of a base 8, and a removable shell 9, the latter having threaded connection at 10, with the former. The said base 8, carries a fixed section 11, of tubing which is formed of case-hardened steel and as shown, in Fig. 2, said tubing is extended through the flooring A, at a point immediately adjacent to the steering column and parallel therewith. Within the tubing, a hollow shaft 12, is journaled, the lower end of which having a gear wheel 13, fixed thereto which is adapted to co-act with a mutilated gear wheel 14, on the shaft 15, of the clutch pedal 16. A suitable spring 17, is employed for the purpose of normally holding the teeth of the gear wheel 14, in mesh with the teeth on the wheel 13. It is therefore evident that when the shaft 12, is locked against rotation, the clutch pedal 16, cannot be moved nor the clutch operated.

Beneath the gear wheel 13, is a disk 18, having a slot 19, therein, which receives the trunnion 20, formed on a cylindrical body 21, which is free to slide in the bore 22, of a bracket 23, the latter having fixed connection with the flooring (A). This bracket forms a part of a locking or latch mechanism which includes a sliding pin 24, which, when projected to a point beyond the adjacent end of the bracket is adapted to engage in one of the recesses 5, in the disk 4, of the steering shaft 1. A spring 25, is located in the bore 22, and positioned between the member 21 and the head 26, the latter forming a part of the pin 24. A second spring 27, is positioned between the opposite end of the bracket 23, and the head 26, whereby the effective locking end of the pin will be normally held in an inactive position. When pressure is applied to the spring 25, the condition is different and said effective locking end of the pin will be projected beyond the adjacent end of the bracket. From the mechanical details just mentioned, it follows that movement in either direction can be transmitted to the pin 24, by oscillating the hollow shaft 12. The shaft 12, will hereinafter be termed "actuator" in view of the function which it performs.

At the upper end the shaft 12, is provided with a cam 28, having a crank arm 29, whose pin 30, is normally extended in the branch 31, of a cam slot 32, the latter having a concentric branch 33. The crank arm carries a second pin 34, which has fixed connection with the bail 35, of a permutation lock 36. Said lock may be of any suitable well known construction and it is seen that when the bail is in the position shown in full lines in Fig. 2, and in dotted lines in Fig. 3, the pin 30, will be disposed at one end of the branch 31, of the slot 32. Consequently, when the bail is retracted, the hollow shaft 12 or actuator, cannot be turned. After the lock has been set to the designated combination, the bail is free to be moved to a released position and consequently, the shaft or actuator 12, can be turned. The clutch pedal is then free and by pressing upon the same the clutch may be thrown in and motion imparted to the member 21, in order to permit the pin 24, to be retracted from its co-acting disk 4.

The cam disk 28, carries an interrupter 37, of insulating material which is adapted to be projected under the knife 38, of a circuit closer 39, which is arranged in an electric circuit 40, forming part of an ordinary ignition system. The knife 38, has connection with a rocker 41, having controlling pins 42 and 43, whereby movement can be imparted to the knife to throw it into or out of engagement with the switch elements 44, of said circuit closer. The interrupter thus extends beneath the blade of the switch when the cam disk 28, is in the position shown in Figs. 2 and 3. The ignition circuit may be closed after the permutation lock has been released and the clutch pedal and steering column operated.

In some restricted sections of large municipalties, it is unlawful to permanently anchor a vehicle upon the highway as the same cannot be moved at the time of fires or the like upon adjacent properties. In order to permit the clutch pedal and the ignition system to be controlled independent of an operation of the pin 24, I provide a selective mechanism 46, consisting of a rocker 47, having a projecting lug or extension 48, which is adapted to be thrown or adjusted over the path of movement of the pin 24, and thereby prevent said pin from being projected into one of the receiving recesses 5, in said disk 4. The steering column is then free and the front wheels of the vehicle may be quickly turned and the car towed if desired.

In the form of the invention shown in Figs. 7 to 11 inclusive, the permutation lock 49, includes a shaft 50, having a gear section 51, meshing with a gear wheel 52, on a hollow shaft or actuator 53. The shaft 50, is provided with a hand lever 50ª, whereby it may be operated manually. The shaft carries a cam disk 54, similar to the disk 28, in the preferred embodiment, the slot 55, of which being substantially identical with the slot in said first mentioned disk 28, and it receives a pin 56, which extends from the bail 57, of the lock mechanism. The shaft or actuator 53, is provided at its lower end with a disk 58, having tangential slots 59, and 60, the former having connection with a sliding member 61, operating in a guide 62, and against a spring 63. This spring bears against the head 64, of a latch pin 65, which is adapted to enter a keeper recess 66, in the clutch pedal 67. A spring 68, is interposed between the outer end of the guide 62, and the head 64, and has a greater strength than the spring 62, so that the pin 65, may be promptly retracted at the requisite time. The slot 60, has connection with a sliding member 69, which operates in a guide 70. Said guide has mounted therein a locking pin 71, which is adapted to be projected into any one of an annular series of recesses 72, formed in the locking disk 73, on the steering post. Interposed between the head 74, of the pin 71, and the member 69, is a spring 75, while between the outer end of the guide and the opposite side of said head is a spring 76. A rocker 77, is employed in this form and it is adapted to be extended over the outer end of the guide 70, to prevent the pin 71, from being projected into the disk 73.

The circuit 78, includes a circuit closer 79, having terminals 80 and 81, while upon the shaft or actuator 53, is a knife 82, which is adapted to span the terminals 80 and 81, to close the ignition circuit when the clutch pedal and the steering column are operatively released. The other mechanical details in this form and the functional results flowing therefrom are substantially equivalent to the first embodiment of the invention.

Figure 2:
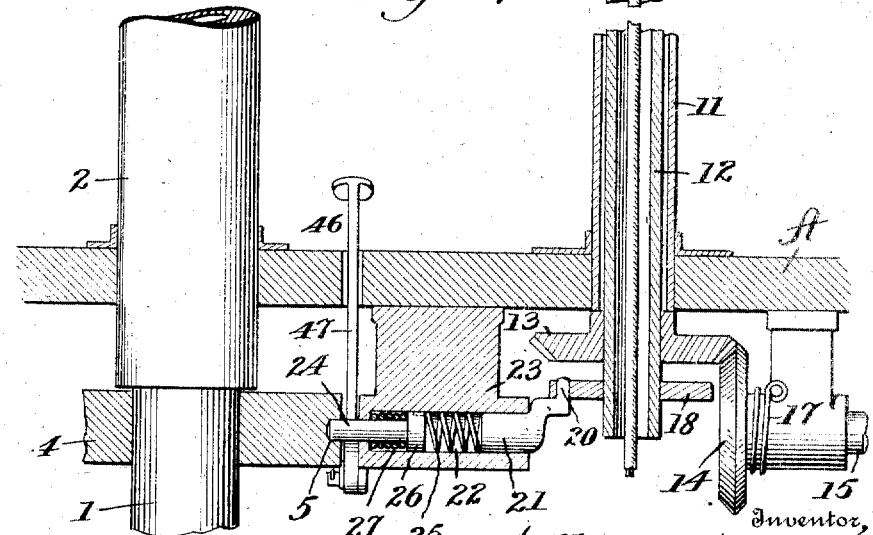
Fig. 2 is a vertical section through the device with parts in elevation.
Figure 3:
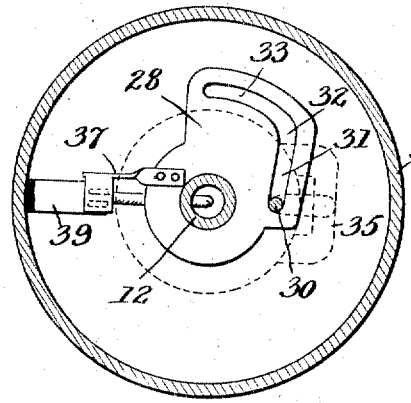
Fig. 3 is a section on the line 3—3 of Fig. 2.
Figure 4:
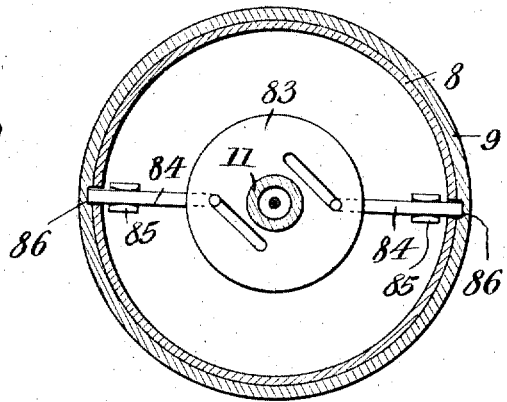
Fig. 4 is a section on the line 4—4, of Fig. 2.
Figure 5:
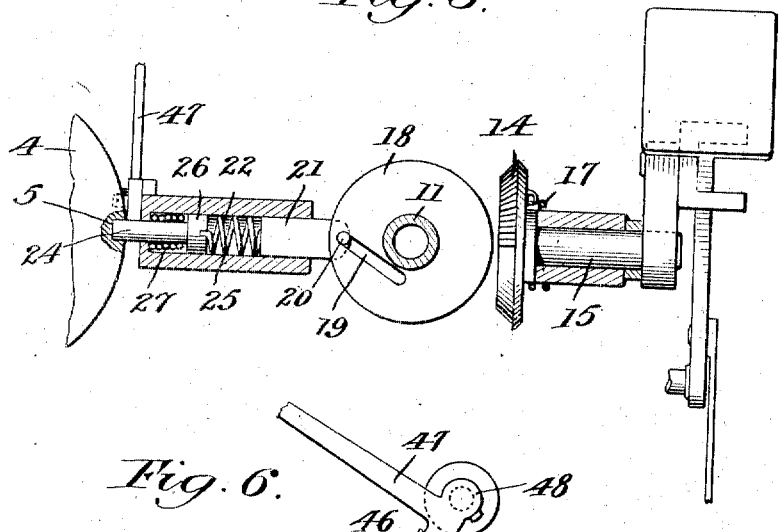
Fig. 5 is a plan view of the device with parts in section.
Figure 6:
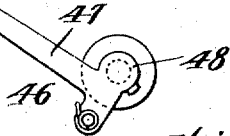
Fig. 6 is a side elevation of the rocker.

Fixed to the shaft 12, is a disk 83, having horizontally movable locking fingers 84—84, the outer ends of which finding bearings in passages 85, in the base 8. The outer walls of the shell 9, are provided with keeper openings 86, which are adapted to receive said locking fingers as shown in Fig. 2. In this manner, the shell is locked to the base at the same time of locking the steering column, the clutch pedal and ignition system. This prevents one from opening the shell and gaining access to the working mechanism therewithin.

What is claimed as new is:—

1. An automobile locking device, comprising an actuator parallel to, independent of and arranged at one side of the steering shaft, a permutation lock, means between said lock and said actuator for holding the latter against movement and adapted to permit the actuator to be operated when the lock is released, securing mechanism adjacent to the vehicle floor, and means controlled through the actuator for effecting adjustments of said mechanism.

2. An automobile locking device; comprising an actuator parallel to, independent of and arranged at one side of the steering shaft; a permutation lock; means between said lock and said actuator for holding the latter against movement and adapted to permit the actuator to be operated when the lock is released; a disk shaped keeper fast on the steering shaft adjacent to the vehicle floor, a bolt adapted to engage said keeper, and means for transmitting motion from said actuator to said bolt.

3. An automobile locking device; comprising an actuator parallel to, independent of and arranged at one side of the steering shaft; a permutation lock for holding and releasing said actuator, and means controlled by said actuator for preventing movement of the clutch mechanism of the vehicle.

4. An automobile locking device; comprising an actuator parallel to, independent of and arranged at one side of the steering shaft; a permutation lock for holding and releasing said actuator; a cam fast on said actuator; means between said cam and lock for holding the actuator against movement when the lock is set, and means adjacent to the floor of the vehicle controlled by said actuator for locking one of the controlling members of the vehicle.

5. An automobile locking device; comprising an actuator parallel to, independent of and arranged at one side of the steering shaft; a permutator lock for holding and releasing said actuator; a cam fast on said actuator; means between said cam and lock for holding the actuator against movement when the lock is set; a circuit closer; and an interrupter for said circuit closer carried by the actuator.

In testimony whereof I affix my signature.

WILLIAM G. VANCE.